United States Patent [19]

Omura

[11] Patent Number: 5,111,223
[45] Date of Patent: May 5, 1992

[54] CAMERA SYSTEM

[75] Inventor: Hiroshi Omura, Tokyo, Japan

[73] Assignee: Fuji Photo Film Co., Ltd., Kanagawa, Japan

[21] Appl. No.: 718,474

[22] Filed: Jun. 20, 1991

[30] Foreign Application Priority Data

Jul. 2, 1990 [JP] Japan .................. 2-174996

[51] Int. Cl.$^5$ .............................................. G03B 41/00
[52] U.S. Cl. ........................... 354/111; 354/118; 354/159; 354/195.12
[58] Field of Search ............. 354/111, 118, 159, 195.12

[56] References Cited

U.S. PATENT DOCUMENTS 1,410,557 3/1922 Douglass .
3,618,495 11/1971 Kuhns .

Primary Examiner—Michael L. Gellner
Attorney, Agent, or Firm—Sughrue, Mion, Zinn, Macpeak & Seas

[57] ABSTRACT

A camera system for taking i.d. (identification) pictures includes a camera body having a pair of taking lenses, to which one of a plurality of film holders of different film formats is removably attachable from the rear side of the camera body, depending on what film format is suitable for the size of photographs to be taken. A deflection unit deflecting the optical axes of the taking lenses, or a conversion lens unit changing the magnification of the taking lenses as well as deflecting the optical axes of the taking lenses is removably attachable to the front of the taking lenses, depending on the size of the photographs to be taken.

9 Claims, 4 Drawing Sheets

CAMERA SYSTEM

BACKGROUND OF THE INVENTION

The present invention relates to a camera system, and especially relates to a camera system for simultaneously taking more than one picture of the same subject, such as in the case of taking identification portrait photographs.

An instant photography camera having four taking lenses arranged in matrix on the front thereof is known as an identification photography camera, which can simultaneously take four pictures of the same person. The camera is mounted with a film holder holding peel-apart type self-developing film units, so-called instant film. After exposure, by pulling a tab of the instant film that protrudes from the film holder, a photosensitive layer and an image receiving layer of the instant film are taken out from the film holder; these layers being superposed on each other and thus being stuck together. When the image receiving layer is removed from the photosensitive layer after a given time, four positive images of the same subject, arranged in matrix, appear on the image sensitive layer. By cutting the image receiving layer into the individual images, four identification photographs are provided.

The size of pictures obtained with the known instant photography camera is unchangeable, so that it is necessary to provide a specific camera for each different size identification photograph, such as an exam photograph (e.g. 3×4 cm), a passport photograph (e.g. 5×5 cm), a driving license photograph (e.g. 2.4 ×3 cm) and so forth.

SUMMARY OF THE INVENTION

In view of the foregoing, an object of the present invention is to provide a camera system suitable for identification photography in which it is possible to change the size of photographs easily, so that various sizes of identification photographs can be taken at low cost.

To achieve the above and other objects and advantages, a camera system of the present invention comprises a camera body having a pair of taking lenses, a plurality of film holders of different film formats which are removably attachable to the rear of the camera body, a deflection unit for deflecting the optical axes of the taking lenses, a conversion lens unit for changing the magnification of the taking lenses as well as for deflecting the optical axes of the taking lenses, and a device for attaching and detaching either of these units to and from the front of the taking lenses.

One of a plurality of film holders of different film formats is attached to the rear of the camera body depending on what film format is suitable for the size of identification photographs to be taken. Depending also on the size of identification photographs to be taken, none or either one of the deflection unit or the conversion lens unit is attached to the front of the taking lenses. In this way, it becomes possible to take pictures whose size and/or positions relative to each other and relative to the recording film are changed depending on the size of identification photographs to be taken, by means of a single inexpensive camera system.

BRIEF DESCRIPTION OF THE DRAWINGS

The above and other objects and advantages of the present invention will become apparent from the following detailed description of preferred embodiments when read in conjunction with appended drawings, wherein.

DETAILED DESCRIPTION OF THE PREFERRED EMBODIMENTS

Figure 1:
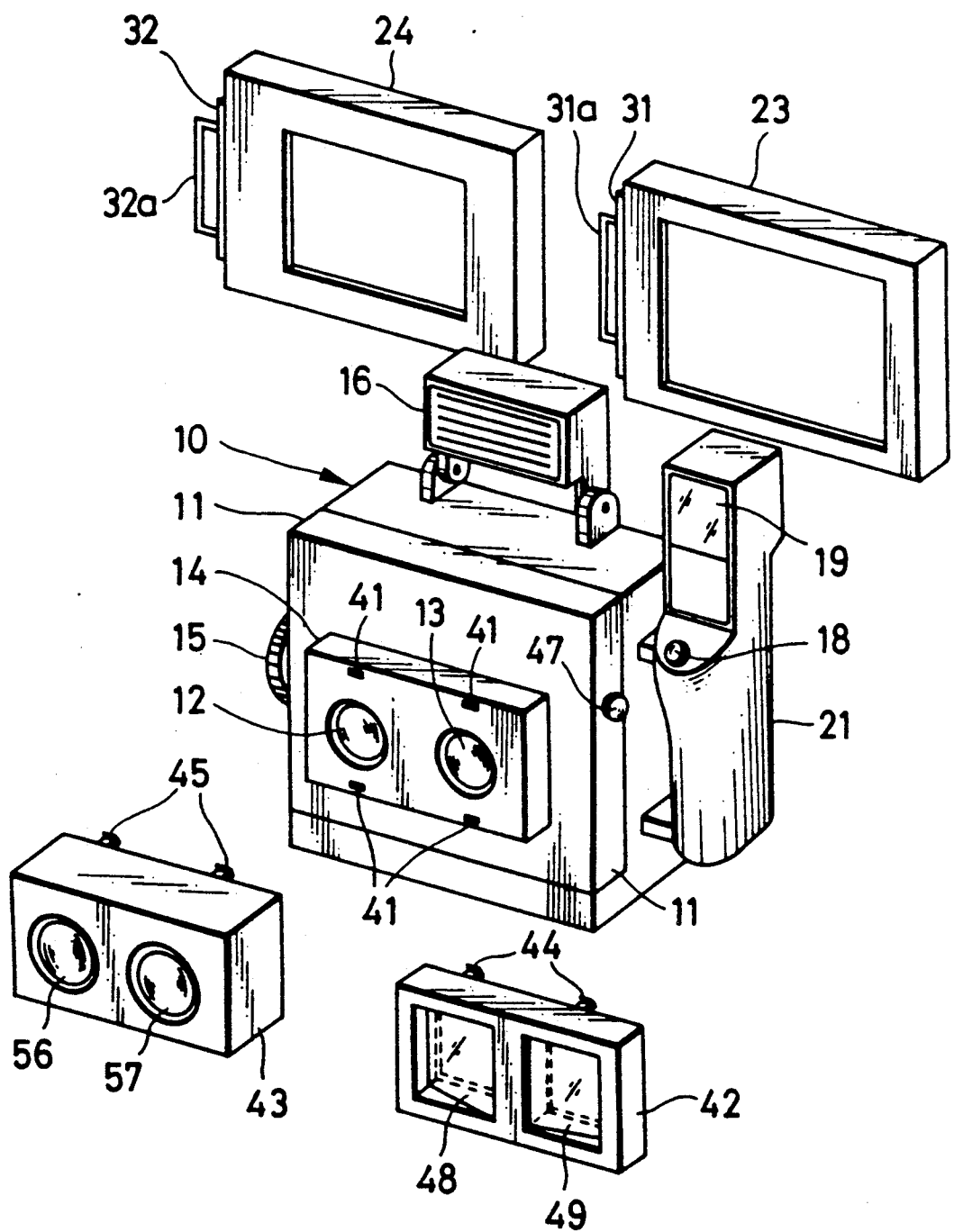
FIG. 1 is perspective view of a camera system according to a first embodiment of the invention.

FIG. 1 shows the outer appearance of an instant photography camera system according to an embodiment of the present invention, wherein a camera body 10 has a front plate 11 which is movable along the optical axis of taking lenses 12 and 13 for focusing. The taking lenses 12 and 13 are held in a housing 14 which is securely attached to the front surface of the movable front plate 11. On one side of the camera body 10, there is a focusing knob 15 rotatable to move the front plate 11. On the opposite side of the camera body 10, there is mounted a grip 21 provided with a shutter button 18 and an illuminating window type finder 19. A flash unit 16 is attached to the top of the camera body 10.

Either of two kinds of film holders 23 and 24 having different film formats can be removably mounted on the rear of the camera body 10. The first film holder 23 is adapted to hold a plurality of peel-apart type 4×5 inch instant film, and the effective image plane or exposure area thereof is 90×118 mm, for instance. The plurality of instant film are enclosed in a film pack 27, which is then inserted in the film holder 23 as shown in FIG. 2.

The second film holder 24 is adapted to hold a plurality of standard size peel-apart type instant film whose format is smaller than that of the 4×5 inch instant film. The effective image plane of the second film holder 24 is, for example, 74×96 mm. The instant film are also enclosed in a film pack 29, and the film pack 29 is inserted in the film holder 24. It is to be noted that each film holder 23, 24 is provided with a light-shielding plate 31, 32, which is removable from the film holder by pulling a lug 31a, 32a of the light-shielding plate 31, 32. The light-shielding plates 31 and 32 shield the instant film in the film holders 23 and 24 from ambient light when the film holder 23, 24 is separated from the camera body 10.

Figure 2:
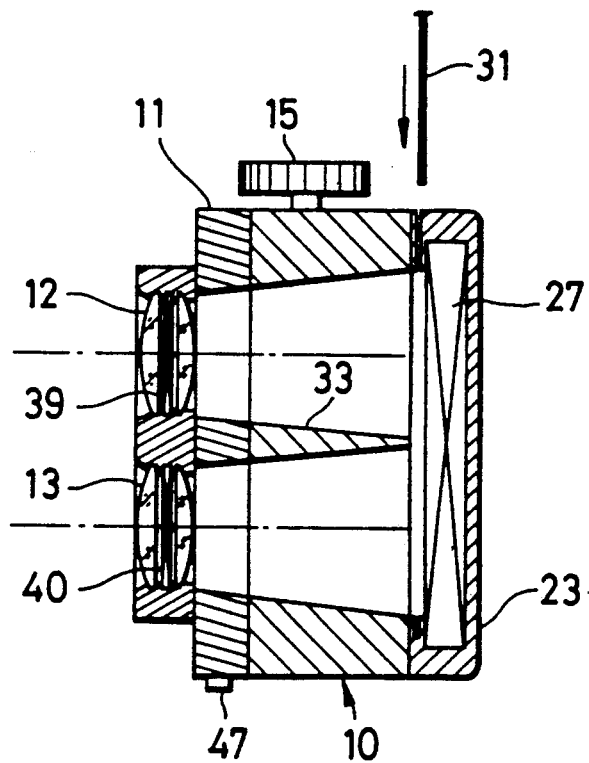
FIG. 2 is a sectional view of the camera body attached with the first film holder.
Figure 5:
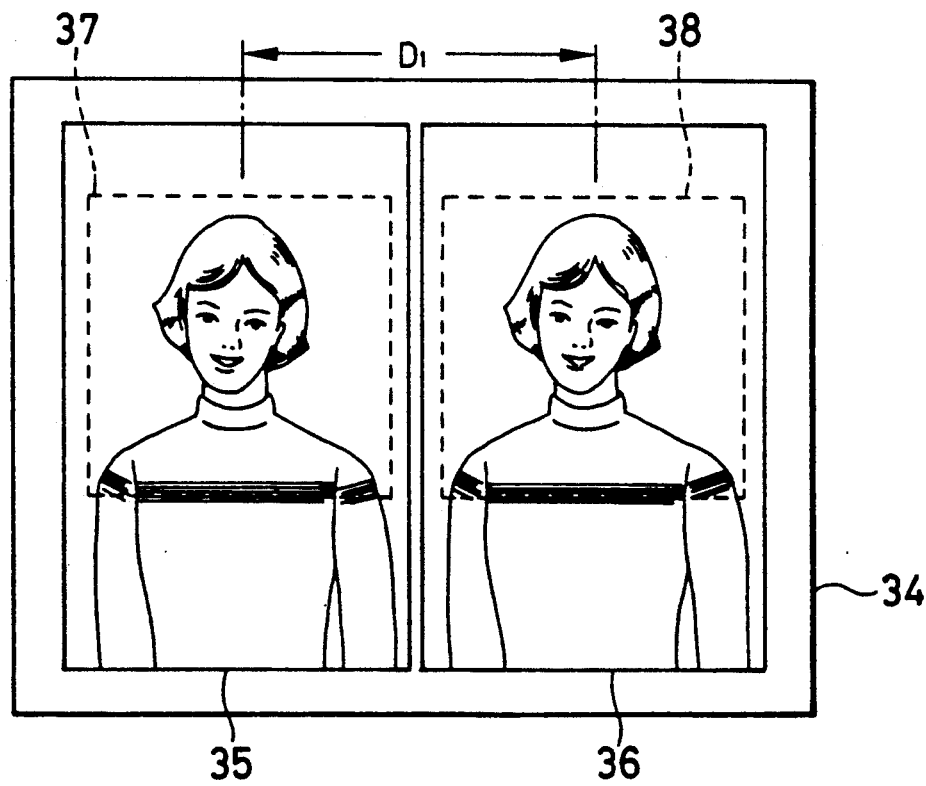
FIG. 5 is an example of photographs taken by the camera system in the state of FIG. 2.

As shown in FIG. 2, a vertical separating wall 33 extends through the inside of the camera body 10 and separates it in the middle, so that two exposure chambers are provided. Light beams reflected from a subject form images on the film surface of the upper most film of the film pack 27 through the taking lenses 12 and 13, thereby providing simultaneously two pictures of the same subject. As a result, as shown in FIG. 5, for example, two picture frames 35 and 36, each including a positive image of the main subject, are made on an image receiving layer 34 of the instant film after development. The distance D1 between the vertical center lines of these picture frames 35 and 36 is, for example, 59 mm By trimming the picture frames 35 and 36 each into a 5×5 cm sheet, for instance, two identification photographs or portraits 37 and 38 suitable for a passport are made. It is to be noted that the reference numerals 39 and 40, seen in FIG. 2, designate shutters disposed inside the taking lenses 12 and 13, respectively.

The housing 14 has four engaging holes 41 formed on the front wall thereof. By means of these holes 41, a prism unit 42 or a conversion lens unit 43 can be mounted on the front wall of the housing 14. That is, the prism unit 42 and the conversion lens unit 43 are each formed on the rear wall thereof with four engaging claws 44, 45 engagable in the holes 41 thereby to secure the unit 42 or 43 to the housing 14, though merely the upper two of these claws 44, 45 are shown in FIG. 1, respectively. A unit release button 47 provided on one side of the front plate 11 is depressed to release the engagement between the engaging holes 41 and the engaging claws 44 and 45 so as to remove the prism unit 42 and the conversion lens unit 43 from the housing 14.

Figure 3:
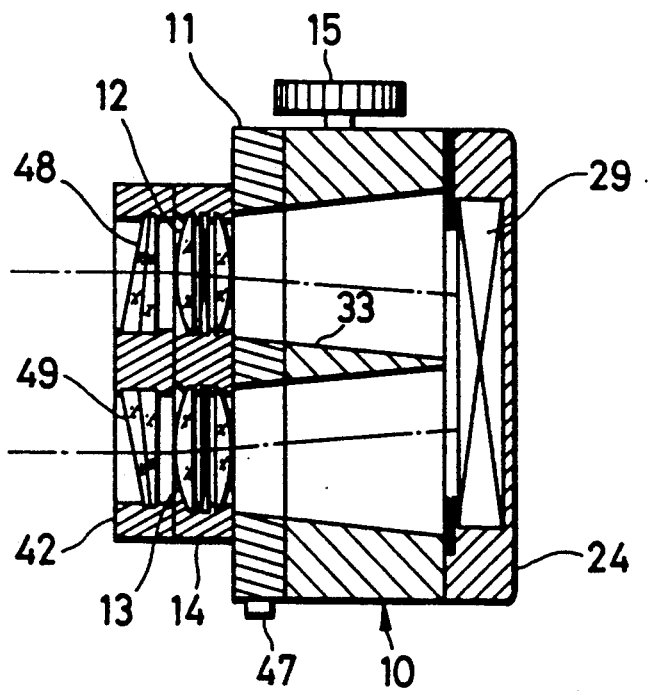
FIG. 3 is a sectional view of the camera body attached with the second film holder and the prism unit.

As shown in FIG. 3, the prism unit 42 includes therein a pair of prisms 48 and 49 disposed respectively in front of the taking lenses 12 and 13 when the prism unit 42 is attached to the housing 14, whereby the optical axes of the taking lenses 12 and 13, are bent toward each other. When the prism unit 48 is attached, the second film holder 24 is attached to the rear of the camera body 10. As a result, light beams from the subject travel through the prisms 48, 49 and the taking lenses 12, 13, thereby simultaneously recording two images of the same subject on the upper most film of the film pack 29.

Figure 6:
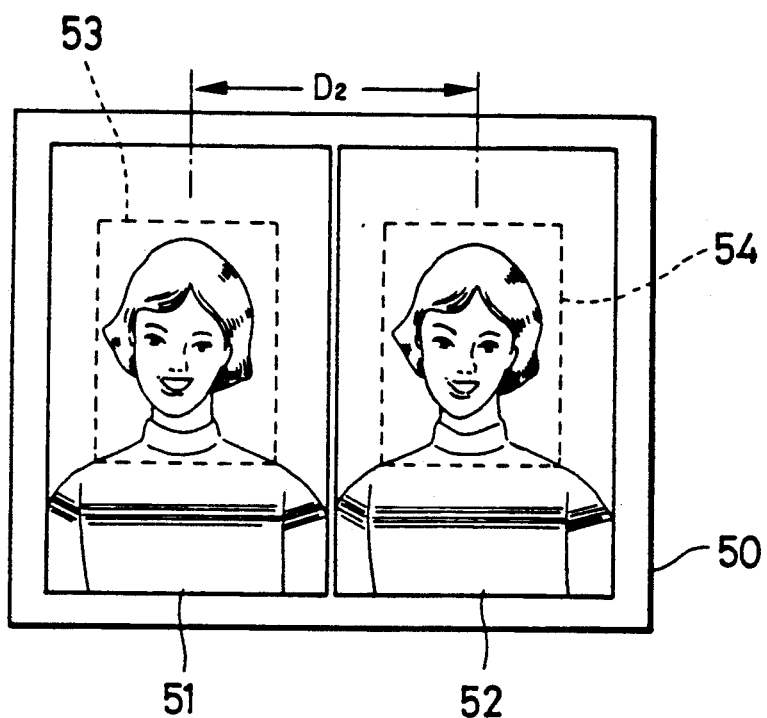
FIG. 6 is an example of photographs taken by the camera system in the state of FIG. 3.

FIG. 6 shows an example of two picture frames 51 and 52, each including a positive image of the main subject, which are photographed in this state and appearing on an image receiving layer 50 of the instant film after development. The distance D2 between the vertical center lines of these picture frames 51 and 52 is less than the above distance D1, for example, 48 mm, and the images of the main subject are disposed substantially in the center of the respective picture frames 51 and 52. By trimming the picture frames 51 and 52 each into a 3×4 cm sheet, for instance, two exam photographs 53 and 54, that is, identification photographs applicable to an application for examination are made. Of course, it is possible to make the same exam photographs by trimming the picture frames 35 and 36 of FIG. 5 each into a 3×4 cm sheet, but the waste of photographic film will increase in this case. On the other hand, trimming of the picture frame 51, 52 into a 3×4 cm sheet will provide less waste.

Figure 4:
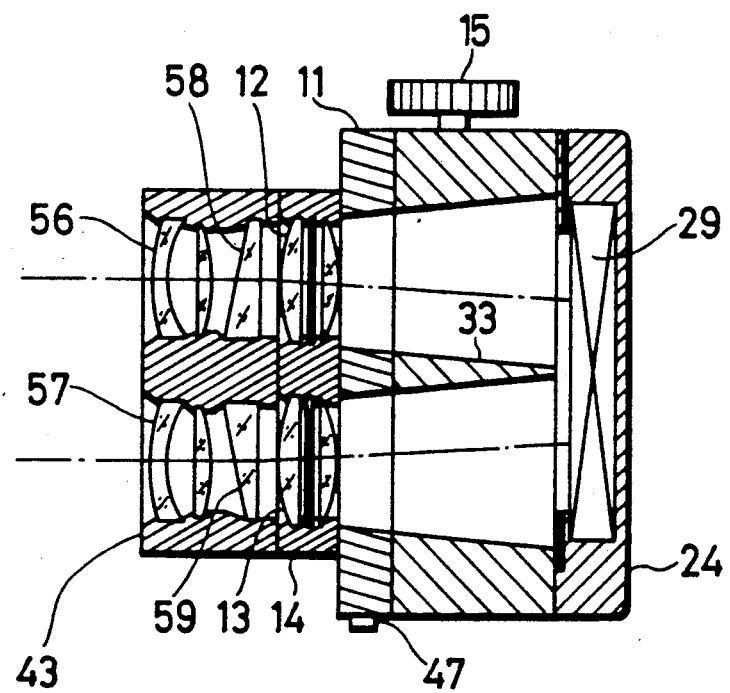
FIG. 4 is a sectional view of the camera body attached with the second film holder and the conversion lens unit.

As shown in FIG. 4, the conversion lens unit 43 includes a pair of wide-angle conversion lenses 56 and 57 and a pair of prisms 58 and 59 disposed forwards of the conversion lenses 56 and 57. The wide-angle conversion lenses 56 and 57 lower the magnification of the taking lens 12 and 13, for example, by a factor of 0.78. The prisms 58 and 59 bend the optical axes of the taking lenses 12 and 13 toward each other. Therefore, light beams from the subject travel through the conversion lenses 56, 57, the prisms 58, 59 and the taking lenses 12, 13, and form two images on the upper most film of the film pack 29.

Figure 7:
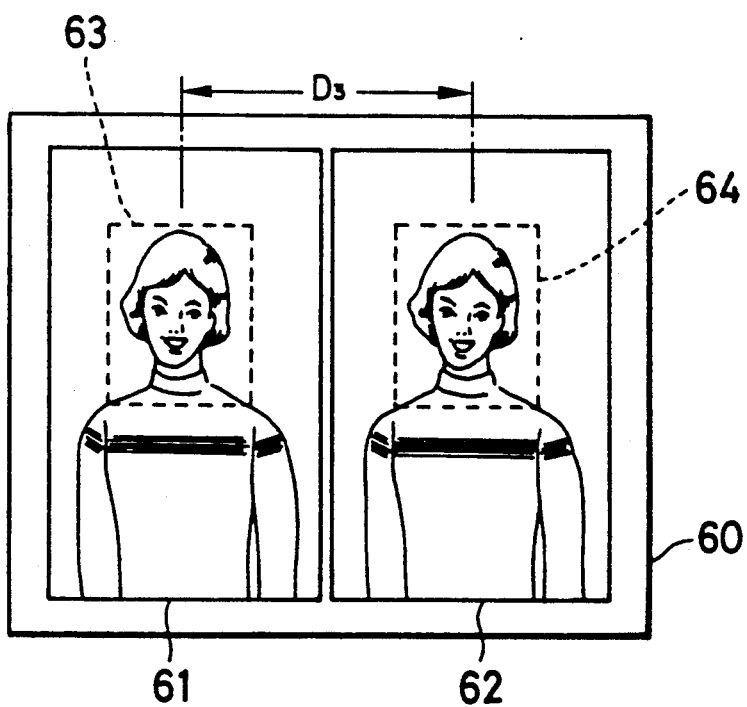
FIG. 7 is an example of photographs taken by the camera system in the state of FIG. 4.

FIG. 7 shows an example of picture frames 61 and 62 photographed in this state and each including a positive image of the main subject that appears on an image receiving layer 60 after development. The distance D3 between the vertical center lines of the picture frames 61 and 62 is less than the distance D1, for example, 48 mm. As seen, in the picture frames 61 and 62, the images of the main subject are smaller than those of the above positive images 35, 36, 51 and 52, though the subject images are disposed also in the centers of the picture frames 61 and 62, respectively. By trimming the picture frames 61 and 62 each into a 2.4×3 cm sheet, for instance, two license photographs 63 and 64, that is, identification photographs suitable for a driving license are provided.

The operation of the above described instant photography camera system is as follows:

When taking passport-photographs, the first film holder 23 is attached to the rear of the camera body 10. While viewing the subject through the finder 19, the user frames the main subject in the center of the finder frame and rotates the focusing knob 15 to move the front plate 11 back and forth to focus the taking lenses on the subject. Thereafter, the light-shielding plate 31 is pulled out from the film holder 23, and the shutters 38 and 39 are opened and closed upon depression of the shutter button 18, so that two images of the subject are simultaneously recorded on a sheet of instant film. In this embodiment, the flash unit 16 is also activated simultaneously with the shutters 38 and 39.

After exposure, by pulling a not-shown tab of the film sheet that protrudes from the film holder 23, a leading portion of the film sheet is nipped between a pair of rollers. By pulling the leading portion, a photosensitive layer (not-shown) and the image receiving layer 34 of the film sheet are taken out from the film holder 23; these layers being superposed on each other. Simultaneously, a developer pod provided in a mask sheet attached to the image receiving layer 34 is pressed and broken by the rollers to distribute the developing solution to the spacing between the light sensitive layer and the image receiving layer 34, in a conventional manner. When a given time has passed thereafter, the image receiving layer 34 is removed from the photosensitive layer 34. As a result, the picture frames having positive images 35 and 36 appear on the image sensitive layer 34, as shown in FIG. 5. By trimming the picture frames 35 and 36 each into a 5×5 cm sheet, two passport-photographs 37 and 38 are provided.

When taking exam photographs, the second film holder 24 is attached to the rear of the camera body 10. If, at that time, the first film holder 23 has been attached to the camera body 10, the first film holder 23 is removed from the camera body 10 after the light-shielding plate 31 is inserted back into the film holder 23. Furthermore, the prism unit 42 is attached to the front of the housing 14 by pushing the prism unit 14 toward the camera body 10 while putting the engaging claws 44 of the prism unit 42 into the engaging holes 41 of the housing 14. The light-shielding plate 32 is pulled out from the second film holder 24 prior to depression of the shutter button 18.

The prisms 48 and 49 deflect the optical axes of the taking lenses 12 and 13, so that the spacing between the two resulting images becomes smaller compared with the passport-photograph taken only through the taking lenses 12 and 13. This smaller spacing corresponds to the film format of the second film holder 24 that is smaller than the film format of the first film holder 23, such that each resulting image is disposed in the center of the picture frame 51, 52, as shown in FIG. 6. By trimming the picture frames 51 and 52 each into a 3×4 cm sheet, two exam photographs 53 and 54 are provided.

When taking license-photographs, the conversion lens unit 43 is attached to the front of the housing 14. If, at that time, the prism unit 42 and the second film holder 24 have been attached to the camera body 10, the prism unit 42 must of course be removed from the camera body 10. The engagement between the claws 44 or 45 and the holes 41 can be released by depressing the unit removing button 47, so as to remove the prism unit 42 or the conversion lens unit 43 from the front plate 14. The conversion lens unit 4 changes the magnification of the taking lenses 12 and 13 and, at the same time, deflects the optical axes thereof such that the resulting images of the main subject are always formed in the respective centers of the picture frames in spite of the change of magnification. In this way, for example, the image receiving layer 60 having the picture frames 61 and 62 as shown in FIG. 7 is provided. By trimming the picture frames 61 and 62 each into a 2.4 ×3 cm sheet, two license-photographs 63 and 64 are provided.

It is to be noted that if passport-photographs, exam photographs and license-photographs of the same subject are to be taken, since the focal plane remains unchanged even when the prism unit 42 or the conversion lens 43 is attached, it is only necessary to perform focusing and framing once. The user has only to change the film holder 23, 24, and to attach or detach the prism unit 42 or the conversion lens unit 43.

Although the invention has been described in detail above with reference to the embodiments shown in the drawings, the present invention is not to be limited to instant photography camera systems using instant film, but extends to other types of film, such as a 4×5 inch sheet film or a Brownie film if only film holders suitable for these types of film are attachable to the camera body.

Because the prism unit 42 and the conversion lens unit 43 are intended for use in combination with the second film holder 24, it is preferable to provide a cooperation mechanism that prevents unsuitable combinations of attachments, for example, such that the second film holder is attachable to the camera body only when the prism unit or the conversion lens unit is attached. In this way, the user will not carelessly take large size pictures on a film of smaller format.

Thus, it will be understood that various modifications of the present invention can be effected within the spirit and scope of appended claims.

What is claimed is:

1. A camera system comprising:
a camera body having at least two taking lenses on a front side thereof:
first means for holding at least a photographic film therein of a first film format, said first means being removably attachable to a rear side of said camera body in position to receive images passing through said taking lenses;
second means for holding at least a photographic film therein of a second film format, said second means being removably attachable to said rear side of said camera body in position to receive images passing through said taking lenses;
third means for deflecting optical axes of said taking lenses;
fourth means for changing magnification of said taking lenses as well as for deflecting optical axes of said taking lenses; and connecting means for attaching and detaching either of said third or fourth means to and from said camera body.

2. A camera system as defined in claim 1, wherein said third means comprises at least two prisms, said prisms being disposed forward said two taking lenses, respectively, when said third means is attached to said camera body and arranged to deflect the optical axes of said taking lenses to close toward each other.

3. A camera system as defined in claim 1, wherein said fourth means comprises at least two conversion lenses and two prisms, said conversion lenses being coaxially disposed forward said two taking lenses, respectively, and each said prism being disposed between a respective one of said conversion lenses and a respective one of said taking lenses when said fourth means is attached to said camera body, whereby the optical axes of said taking lenses are deflected to close toward each other and the magnification of said taking lenses is changed.

4. A camera system as defined in claim 1, wherein said third and fourth means deflect the optical axes of said taking lenses to form at least two identical images on said photographic film through said taking lenses within an effective exposure area defined by one of said first and second means, said exposure area being equally divided into picture frames each having said images.

5. A camera system as defined in claim 1, wherein said connecting means comprises engaging means formed on said third and fourth means for engaging with said camera body, and means for releasing the engagement between said third or fourth means and said camera body.

6. A camera system as defined in claim 1, wherein said first means comprises a first film holder for a larger film format that is suitable for photography using said taking lenses only, and wherein said second means comprises a second film holder for a smaller film format that is suitable for photography using said third or fourth means in combination with said taking lenses.

7. A camera system as defined in claim 6, wherein said second film holder is attachable to the rear of said camera body only when said third or fourth means is attached to said camera body.

8. A camera system as defined in claim 6, wherein said photographic film includes at least a self-developing film unit.

9. A camera system as defined in claim 6, wherein each said film holders holds a film pack which contains a plurality of said self-developing film units.

* * * * *